US006801912B2

(12) United States Patent
Moskowitz et al.

(10) Patent No.: US 6,801,912 B2
(45) Date of Patent: Oct. 5, 2004

(54) METHOD, SYSTEM, AND PRODUCT FOR SELF-DIRECTED DISTANCE LEARNING

(75) Inventors: Paul Andrew Moskowitz, Yorktown Heights, NY (US); Clifford A. Pickover, Yorktown Heights, NY (US); William Grey, Millwood, NY (US); Stephen J. Boies, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 09/934,162

(22) Filed: Aug. 21, 2001

(65) Prior Publication Data

US 2003/0041064 A1 Feb. 27, 2003

(51) Int. Cl.[7] .............................. G06F 1/00; G06F 15/18
(52) U.S. Cl. ................. 707/10; 707/1; 706/14
(58) Field of Search ............................. 707/1–3, 7, 10, 707/102, 103 R, 104.1; 709/200, 202, 204–205; 434/1.8; 706/14, 45, 46–47

(56) References Cited

U.S. PATENT DOCUMENTS

| 6,400,996 | B1 | * | 6/2002 | Hoffberg et al. | 700/83 |
| 2001/0049087 | A1 | * | 12/2001 | Hale | 434/350 |
| 2002/0087893 | A1 | * | 7/2002 | Shpiro et al. | 713/202 |

* cited by examiner

Primary Examiner—Alford Kindred
(74) Attorney, Agent, or Firm—Duke W. Yee; Stephen C. Kaufman; Lisa L. B. Yociss

(57) ABSTRACT

A data processing system, method, and product are disclosed for self-directed distance learning. The data processing system includes a client computer system coupled to a server computer system utilizing a network. An Internet-based distance learning environment is first accessed from which a first one of multiple, separate information streams is selected. The selected information stream is associated with an educational presentation. The selected information stream is then used to select a second information stream. Both information streams are then presented.

78 Claims, 3 Drawing Sheets

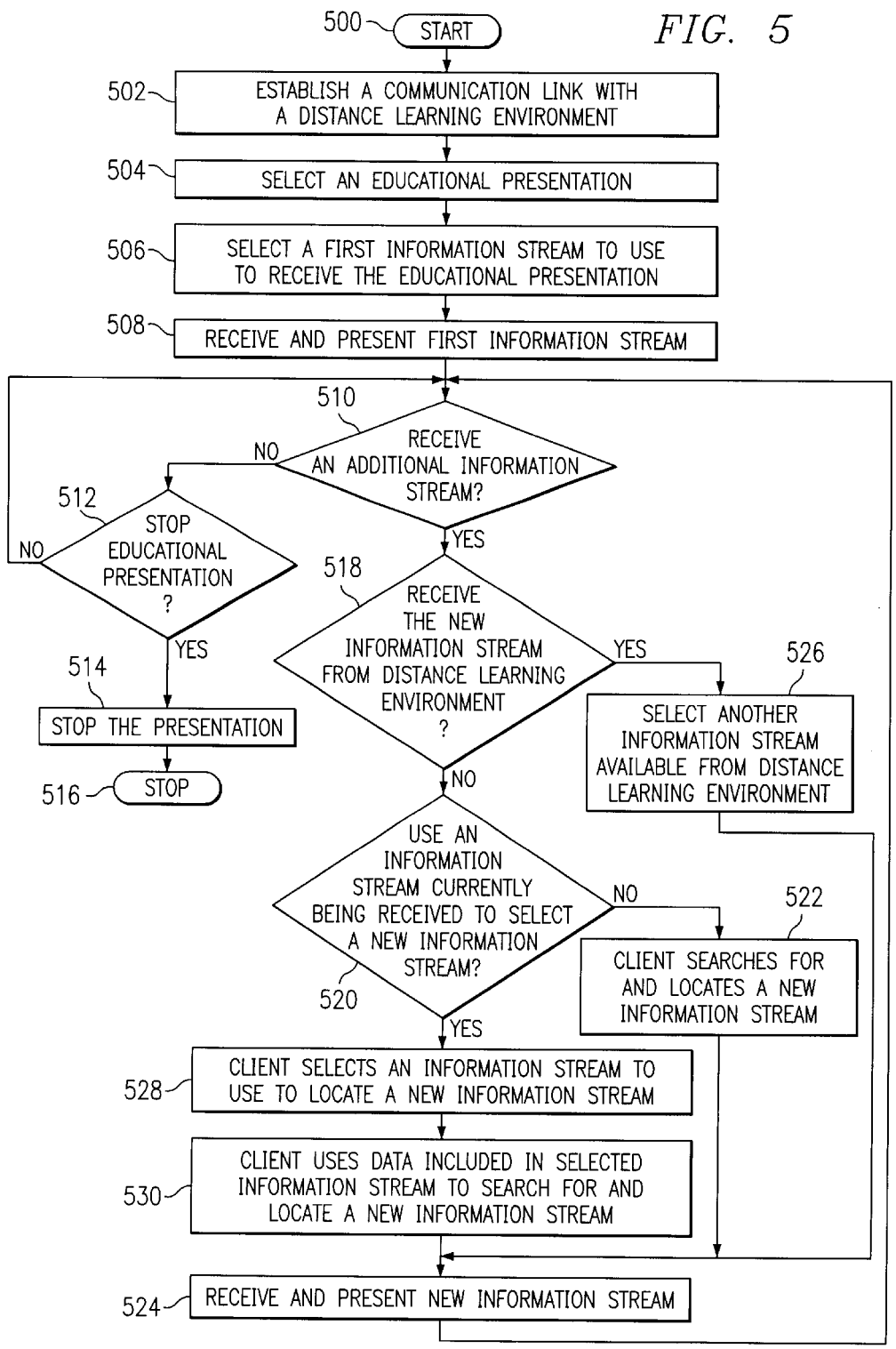

METHOD, SYSTEM, AND PRODUCT FOR SELF-DIRECTED DISTANCE LEARNING

BACKGROUND OF THE INVENTION

1. Technical Field

The present invention relates generally to an improved data processing system, and more particularly to a method, system, and product for providing self-directed distance learning. Still further, the present invention relates to a method, system, and product for providing self-directed distance learning by permitting a user to select a first information stream provided by an Internet-based distance learning environment, and then use the first information stream to select a second information stream.

2. Description of Related Art

A distance learning environment is any learning environment where the student is physically separated from the instructor. Courses have been available in the past as correspondence courses where instruction material was mailed to the student who then completed the work and mailed back the results. Today, distance learning environments are often provided utilizing the Internet.

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols. The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, such as the Internal Revenue Service and secretaries of state, which must interact with virtually all segments of society. Providing informational guides and/or searchable databases of online public records may reduce operating costs.

Internet-based distance learning environments may provide a video stream of a lecturer. The student may access the lecture by accessing the distance learning environment's server computer system using the student's client computer system. The student then may watch the lecture from the student's client computer system.

Although Internet-based distance learning environments have become quite popular and are certainly easier to use than traditional correspondence courses, they provide the student with limited control over the presentation.

Therefore, it would be advantageous to have a method, system, and product for providing self-directed distance learning by permitting a user to control an educational presentation presented to the user by the distance learning environment.

SUMMARY OF THE INVENTION

A data processing system, method, and product are disclosed for self-directed distance learning. The data processing system includes a client computer system coupled to a server computer system utilizing a network. An Internet-based distance learning environment is first accessed from which a first one of multiple, separate information streams is selected. The selected information stream is associated with an educational presentation. The selected information stream is then used to select a second information stream. Both information streams are then presented.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates a high level flow chart which depicts a user controlling an educational presentation presented by an Internet-based distance learning environment utilizing a plurality of information streams in accordance with the present invention.

DETAILED DESCRIPTION OF THE PREFERRED EMBODIMENT

Figure 1:
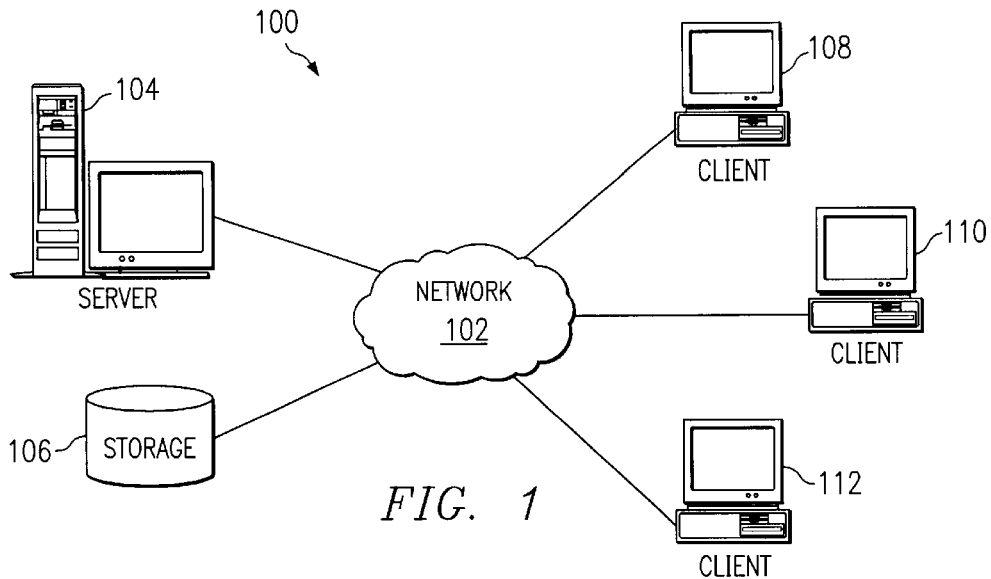
FIG. 1 is a pictorial representation of a distributed data processing system in which the present invention may be implemented.

The invention is preferably realized using a well-known computing platform, such as an IBM RS/6000 workstation running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a method, system, and product that permits a user to direct the user's educational experience. A plurality of different information streams are available to the user. These information streams may be available from a single source, such as a single Internet site, or may be available from several different sources, such as different Internet sites, in addition to information provided by the user's own client computer system. For example, an information stream, such as a stream of music could be provided by a CD inserted into a user's client computer system. Each information stream may include one or more of the following types of information in any combination: video, audio, text, graphical images, music, or any other type of information. The information streams could include a stream of advertising information.

The user first selects an information stream provided by an Internet-based distance learning environment. This first information stream may often be a video stream of a lecturer provided by the distance learning environment. The first information stream is then used to select a second information stream. The client's Web browser, an intelligent software agent, or other type of routine could be used to search for and select a second information stream using the first.

The information streams will typically be provided by a plurality of different sources, such as different server computer systems coupled together utilizing a network. A search for a second stream of information may be conducted utilizing either a closed database which is not available to be modified, or an open database where modifications are permitted.

As an example, a user might first select a video lecturer information stream transmitted by a first Internet site. A speech recognition routine being executed by the user's client computer system could then present various words from the lecture to the user. The user might select one of these words. The Web browser being executed by the user's client computer system could then access an Internet site which provides a search engine to search the Internet for the term selected by the user. Various sites would be presented to the user. One of these sites could be accessed to provide the second information stream.

As another example, pre-specified presentations could be associated with the video lecture. A listing of these pre-specified presentations could be presented to the user. The user might then select one of these presentations as the second information stream.

The present invention also provides a method for receiving an information stream in a first language, translating the information stream from the first language into a second language. The information stream could then be presented in the second language.

The selected information streams are then presented to the user. Although in the examples described above two information streams are presented, more than two information streams could be simultaneously presented to the user.

The present invention could be used to track and record the number of times each user selects a particular information stream. This history information could then be made available from the distance learning environment and used by any user to make selections of information streams. The history information could also be used to design a different distance learning environment.

FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

In the depicted example, a server 104 is connected to network 102 along with storage unit 106. In addition, clients 108, 110, and 112 also are connected to network 102. These clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
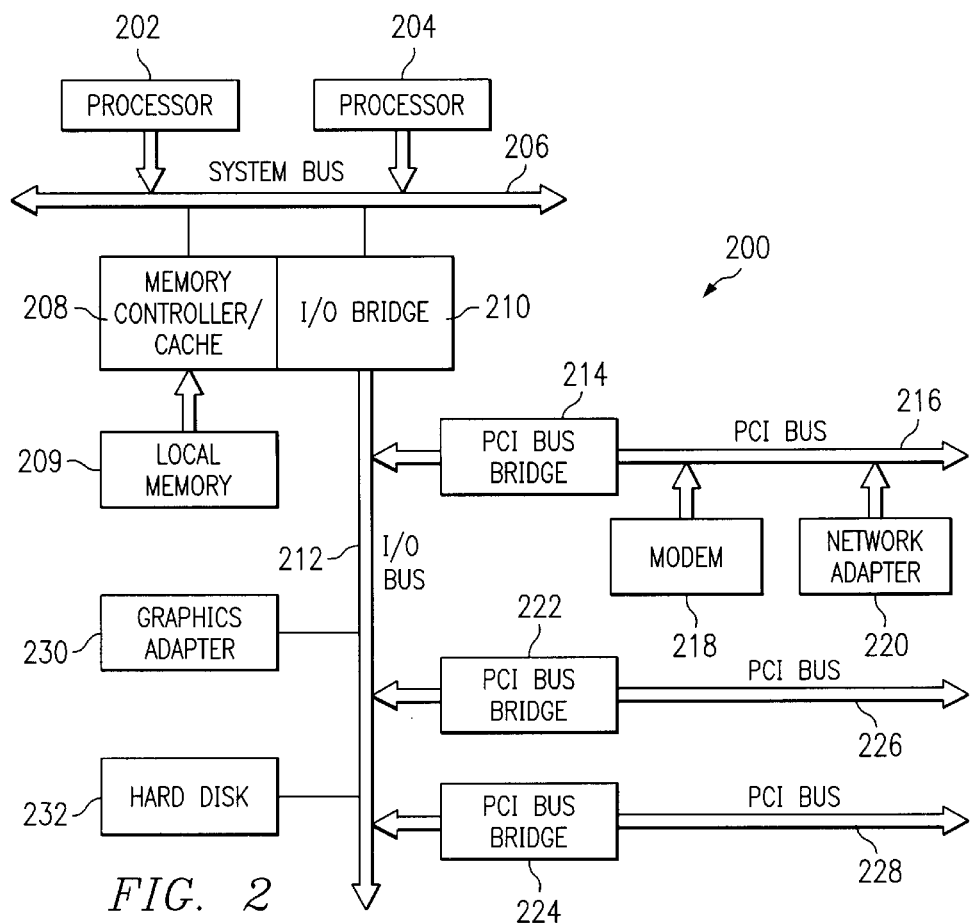
FIG. 2 is a block diagram of a data processing system that may be implemented as a server in accordance with the present invention.

FIG. 2 is a block diagram of a data processing system that may be implemented as a server in accordance with the present invention. Server 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, server 200 allows connections to multiple network computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
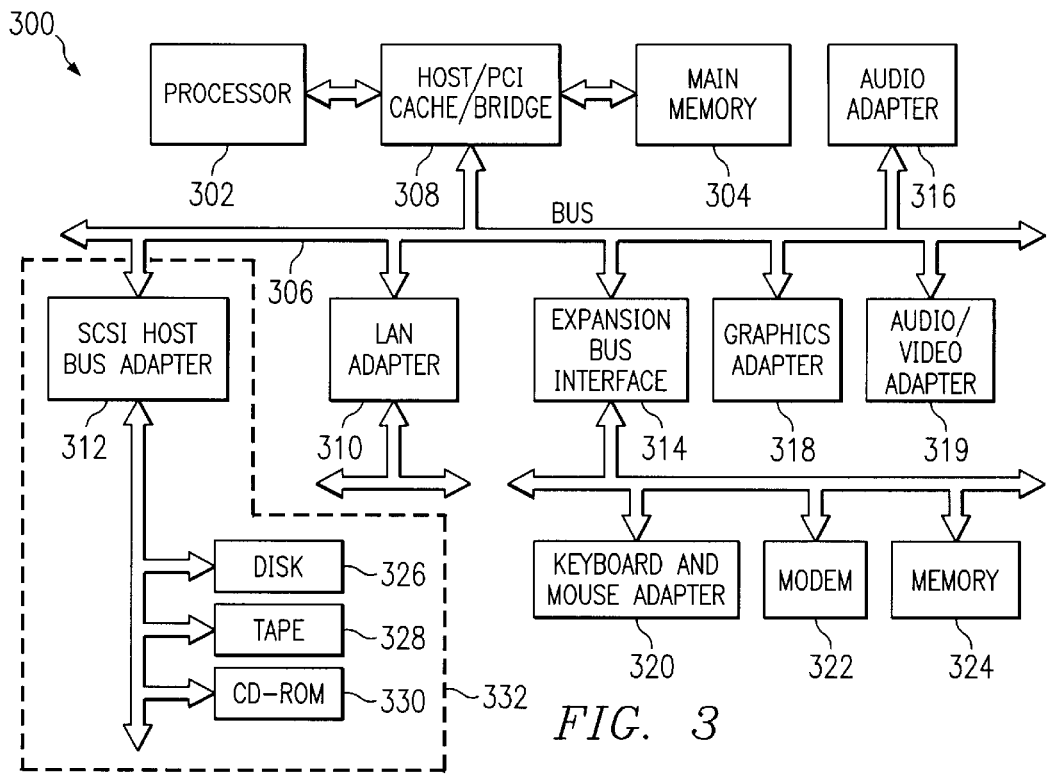
FIG. 3 is a block diagram of a data processing system that may be implemented as a client in accordance with the present invention.

FIG. 3 is a block diagram illustrating a data processing system that may be implemented as a client in accordance with the present invention. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

Data processing system 300 may take various forms, such as a stand-alone computer or a networked computer. As a further example, data processing system 300 may be a personal digital assistant (PDA) device, which is configured with ROM and/or flash ROM in order to provide nonvolatile memory for storing operating system files and/or user-generated data. The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
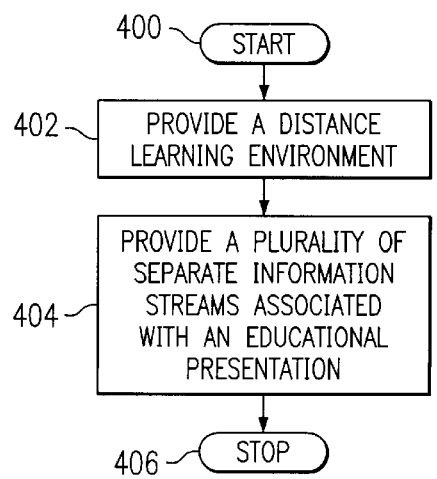
FIG. 4 depicts a high level flow chart which depicts providing a plurality of information streams associated with an educational presentation presented by an Internet-based distance learning environment in accordance with the present invention.

FIG. 4 illustrates a high level flow chart which depicts providing a plurality of information streams associated with an educational presentation presented by an Internet-based distance learning environment in accordance with the present invention. The process starts as depicted by block 400 and thereafter passes to block 402 which illustrates providing a distance learning environment. Next, block 404 depicts providing a plurality of separate information streams associated with an educational presentation. Some or all of these information streams may be presented by the distance learning environment. The information streams may be provided by other sources, which may be but are not necessarily related to the distance learning environment. The process then terminates as illustrated by block 406.

FIG. 5 illustrates a high level flow chart which depicts a user controlling an educational presentation presented by an Internet-based distance learning environment utilizing a plurality of information streams in accordance with the present invention. The process starts as depicted by block 500 and thereafter passes to block 502 which illustrates establishing an Internet-based distance learning environment. Next, block 504 depicts a user selecting an educational presentation. Thereafter, block 506 illustrates a user selecting a first information stream to use to receive the educational program. The process then passes to block 508 which depicts the user's client computer system receiving and presenting the first information stream. Block 510, then, illustrates a determination of whether or not the user wishes to receive an additional information stream. If a determination is made that the user does not wish to receive an additional information stream, the process passes to block 512 which depicts a determination of whether or not to stop the educational presentation. If a determination is made to continue the educational presentation, the process passes back to block 508.

Referring again to block 512, if a determination is made to stop the educational presentation, the process passes to block 514 which illustrates stopping the presentation. The process then terminates as depicted by block 516.

Referring again to block 510, if a determination is made to receive an additional information stream, the process passes to block 518 which depicts a determination of whether or not to receive the new information stream from the server computer system that is providing the distance learning environment. If a determination is made that the new information stream will not be received from the distance learning environment, the process passes to block 520 which illustrates a determination of whether or not the information stream currently being received will be used to select a new information stream. If a determination is made that the information steam currently being received will not be used to select a new information stream, the process passes to block 522 which depicts the client computer system searching for and locating a new information stream from one of a plurality of sources. The new information stream may be available from the client computer, such as from a disk or CD inserted into the client, or it may be available from an Internet site that is unrelated to the distance learning environment site. For example, the client could access a search engine to locate Web sites that provide more information on a topic of interest to the student. Next, block 524 illustrates receiving and presenting the new information stream.

Referring again to block 518, if a determination is made that the new information stream should be received from the server computer system that is providing the distance learning environment, the process passes to block 526 which depicts selecting another information stream that is available from the server computer system that is providing the distance learning environment. For example, several information streams related to a particular video lecture could be provided. A student might receive, along with the video lecture, a listing of related presentations. The student might then be able to chose from one of the related presentations. The process then passes to block 524.

Referring again to block 520, if a determination is made the information stream currently being received is to be used to select a new information stream, the process passes to block 528 which illustrates the client selecting an information stream to use to locate a new information stream. Thereafter, block 530 depicts the client using data included in the selected information stream to search for and locate a new information stream. As described above, the new information stream may be available from the client computer, or from an Internet site that is unrelated to the distance learning environment site. The process then passes to block 524.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system including a client computer system coupled to a server computer system utilizing a network, said method comprising the steps of:
   accessing an Internet-based distance learning environment;
   selecting a first one of a plurality of separate information streams associated with an educational presentation from said Internet-based distance learning environment;
   presenting said first one of said plurality of separate information streams to a user;
   while said first one of said plurality of separate information streams is being presented to said user, selecting content of said first one of said plurality of separate information streams;
   while said first one of said plurality of separate information streams is being presented to said user, utilizing said selected content to select a second one of said plurality of separate information streams to be presented to said user concurrently with said first one of said plurality of separate information streams; and
   presenting said second one of said plurality of separate information streams to said user concurrently with said presented first one of said plurality of separate information streams.

2. The method according to claim 1, further comprising the steps of:
   receiving said first one of said plurality of separate information streams from a first source; and
   receiving said second one of said plurality of separate information streams from a second source, said first source being separate and independent from said second source.

3. The method according to claim 2, further comprising the steps of:
   receiving said first one of said plurality of separate information streams from a first Internet site; and
   receiving said second one of said plurality of separate information streams from a second Internet site, said first Internet site being separate and independent from said second Internet site.

4. The method according to claim 1, further comprising the steps of:
   receiving said first one of said plurality of separate information streams;
   obtaining data from said first one of said plurality of separate information streams;
   utilizing said data to search for said second one of said plurality of separate information stream; and
   simultaneously presenting said second one of said plurality of separate information streams with said first one of said plurality of separate information stream.

5. The method according to claim 4, further comprising the step of utilizing said data to search, utilizing an intelligent agent, for said second one of said plurality of separate in formation stream.

6. The method according to claim 4, further comprising the steps of:
   receiving said first one of said plurality of separate information streams in said client computer system utilizing a Web browser, said first one of said plurality of separate information streams being an audio stream;
   obtaining data from said first one of said plurality of separate information streams utilizing said Web browser; and
   utilizing said data to search for said second one of said plurality of separate information stream.

7. The method according to claim 6, further comprising the step of utilizing said data to search for said second one of said plurality of separate information stream in a closed database.

8. The method according to claim 6, further comprising the step of utilizing said data to search for said second one of said plurality of separate information stream in an open database.

9. The method according to claim 6, further comprising the step of utilizing said data to search for said second one of said plurality of separate information stream in a plurality of computer systems that are coupled utilizing the Internet.

10. The method according to claim 6, further comprising the step of utilizing said data to search for said second one of said plurality of separate information stream in a CD inserted into said client computer system.

11. The method according to claim 6, further comprising the step of utilizing said data to search for said second one of said plurality of separate information stream in a Web site maintained by said server computer system.

12. The method according to claim 6, further comprising the step of obtaining data from said first one of said plurality of separate information streams utilizing a speech recognition routine.

13. The method according to claim 1, further comprising the step of selecting a first one of a plurality of separate information streams, said first one of said plurality of separate information streams being an audio broadcast of a lecturer.

14. The method according to claim 1, further comprising the step of selecting a first one of a plurality of separate information streams, said first one of said plurality of separate information streams being a video broadcast of a lecturer.

15. The method according to claim 1, further comprising the step of selecting said first one of said plurality of separate information streams, wherein said plurality of separate information streams includes a video stream.

16. The method according to claim 1, further comprising the step of selecting said first one of said plurality of separate information streams, wherein said plurality of separate information streams includes an audio stream.

17. The method according to claim 1, further comprising the step of selecting said first one of said plurality of separate information streams, wherein said plurality of separate information streams includes a music stream.

18. The method according to claim 1, further comprising the steps of:
   selecting said first one of said plurality of separate information streams, wherein said plurality of separate information streams includes a presentation presented in a first language;
   approximately simultaneously translating said presentation from said first language to a second language; and
   presenting said presentation in said second language.

19. The method according to claim 1, further comprising the step of selecting said first one of said plurality of separate information streams, wherein said plurality of separate information streams includes a stream of advertising information.

20. The method according to claim 19, further comprising the step of utilizing said first one of said plurality of separate information stream to select a stream of advertising information, said stream of advertising information being related to a content of said first one of said plurality of information streams.

21. The method according to claim 1, further comprising the step of maintaining a history for said distance learning environment by tracking a number of times each one of said plurality of information streams was selected by a user.

22. The method according to claim 21, further comprising the step of designing a second distance learning environment utilizing said history.

23. The method according to claim 1, further comprising to step of maintaining a history for a first user of said distance learning environment by tracking a number of times each one of said plurality of information streams was selected by said first user.

24. The method according to claim 23, further comprising the step of providing said history to a plurality of users of said distance learning environment.

25. The method according to claim 24, further comprising the step of utilizing said history by a second one of said plurality of users to select one of said plurality of information streams.

26. The method according to claim 1, further comprising the step of permitting a user to control an educational presentation presented to said user by said distance learning environment utilizing said plurality of information streams.

27. A computer program product in a data processing system including a client computer system coupled to a server computer system utilizing a network, comprising:

instruction means for accessing an Internet-based distance learning environment;
instruction means for selecting a first one of a plurality of separate information streams associated with an educational presentation from said internet-based distance learning environment;
instruction means for presenting said first one of said plurality of separate information streams to a user;
while said first one of said plurality of separate information streams is being presented to said user instruction means for selecting content of said first one of said plurality of separate information streams;
while said first one of said plurality of separate information streams is being presented to said user, instruction means for utilizing said selected content to select a second one of said plurality of separate information streams to be presented to said user concurrently with said first one of said plurality of separate information streams; and
instruction means for presenting said second one of said plurality of separate information streams to said user concurrently with said presented first one of said separate information streams.

28. The product according to claim 27, further comprising:
   instruction means for receiving said first one of said plurality of separate information streams from a first source; and
   instruction means for receiving said second one of said plurality or separate information streams from a second source, said fist source being separate and independent from said second source.

29. The product according to claim 28, comprising:
   instruction means for receiving said first one of said plurality of separate information streams from a first Internet site; and
   instruction means for receiving said second one of said plurality of separate information streams from a second Internet site, said first internet site being separate and independent from said second Internet site.

30. The product according to claim 27, further comprising:
   instruction means for receiving said first one of said plurality of separate information streams;
   instruction means for obtaining data from said first one of said plurality of separate information streams;
   instruction means for utilizing said data to search for said second one of said plurality of separate information stream; and
   instruction means for simultaneously presenting said second one of said plurality of separate information streams with said first one of said plurality of separate information stream.

31. The product according to claim 30, further comprising instruction means for utilizing said data to search, utilizing an intelligent agent, for said second one of said plurality of separate information stream.

32. The product according to claim 30, further comprising:
   instruction means for receiving said first one of said plurality of separate information streams in said client computer system utilizing a Web browser, said first one of said plurality of separate information streams being an audio stream;
   instruction means for obtaining data from said first one of said plurality of separate information streams utilizing said Web browser; and instruction means for utilizing said data to search for said second one of said plurality of separate information stream.

33. The product according to claim 32, further comprising instruction means for utilizing data search for said second one of said plurality of separate information stream in a closed database.

34. The product according to claim 32, further comprising instruction means for utilizing said data to search for said second one of said plurality of separate information stream in an open database.

35. The product according to claim 32, further comprising instruction means for utilizing said data to search for said second one of said plurality of separate information stream in a plurality of computer systems that are coupled utilizing the Internet.

36. The product according to claim 32, further comprising instruction means for utilizing said data to search for said second one of said plurality of separate information stream in a CD inserted into said client computer system.

37. The product according to claim 32, further comprising instruction means for utilizing said data to search for said second one of said plurality of separate information stream in a Web site maintained by said server computer system.

38. The product according to claim 32, further comprising instruction means for obtaining data from said first one of said plurality of separate information streams utilizing a speech recognition routine.

39. The product according to claim 27, further comprising instruction means for selecting a first one of a plurality of separate information streams, said first one of said plurality of separate information streams being an audio broadcast of a lecturer.

40. The product according to claim 27, further comprising instruction means for selecting a first one of a plurality of separate information streams, said first one of said plurality of separate information streams being a video broadcast of a lecturer.

41. The product according to claim 27, further comprising instruction means for selecting said first one of said plurality of separate information streams, wherein said plurality of separate in formation streams includes a video stream.

42. The product according to claim 27, further comprising instruction means for selecting said first one of said plurality of separate information streams, wherein said plurality of separate information streams includes an audio stream.

43. The product according to claim 27, further comprising instruction means for selecting said first one of said plurality of separate information streams, wherein said plurality of separate information streams includes a music stream.

44. The product according to claim 27, further comprising:
   instruction means for selecting said first one of said plurality of separate information streams, wherein said plurality of separate in formation streams includes a presentation presented in a first language;
   instruction means for approximately simultaneously translating said presentation from said first language to a second language; and
   instruction means for presenting said presentation in said second language.

45. The product according to claim 27, further comprising instruction means for selecting said first one of said plurality of separate information streams, wherein said plurality of separate information streams includes a stream of advertising information.

46. The product according to claim 45, further comprising instruction means for utilizing said first one of said plurality of separate information stream to select a stream of advertising information, said stream of advertising information being related to a content of said first one of said plurality of information streams.

47. The product according to claim 27, further comprising instruction means for maintaining a history for said distance learning environment by tracking a number of times each one of said plurality of information streams was selected by a user.

48. The product according to claim 47, further comprising instruction means for designing a second distance learning environment utilizing said history.

49. The product according to claim 27, further comprising instruction means for maintaining a history for a first user of said distance learning environment by tracking a number of times each one of said plurality of information streams was selected by said first user.

50. The product according to claim 49, further comprising instruction means for providing said history to a plurality of users of said distance learning environment.

51. The product according to claim 50, further comprising instruction means for utilizing said history by a second one of said plurality of users to select one of said plurality of information streams.

52. The product according to claim 27, further comprising instruction means for permitting a user to control an educational presentation presented to said user by said distance learning environment utilizing said plurality of information streams.

53. A data processing system including a client computer system coupled to a server computer system utilizing a network, said method comprising:
   an Internet-based distance learning environment;
   a first one of a plurality of separate information streams associated with an educational presentation being selected from said Internet-based distance learning environment;
   said first one of said plurality of separate information streams being presented to a user;
   content of said first one of said plurality of separate information streams being selected while said first one of said plurality of separate information streams is being presented to said user;
   while said first one of said plurality of separate information streams is being presented to said user, said selected content being utilized to select a second one of said plurality of separate information streams to be presented to said user concurrently with said first one of said plurality of separate information streams; and
   said first and second one of said plurality of separate information streams being presented to said user concurrently with said presented first one of said plurality of separate information streams.

54. The system according to claim 53, further comprising:
   said first one of said plurality of separate information streams being received from a first source; and
   said second one of said plurality of separate information streams being received from a second source, said first source being separate and independent from said second source.

55. The system according to claim 54, further comprising:
   said first one of said plurality of separate information streams being received from a first Internet site; and
   said second one of said plurality of separate information streams being received from a second Internet site, said first Internet site being separate and independent from said second Internet site.

56. The system according to claim 53, further comprising:
said first one of said plurality of separate information streams being received;
data being obtained from said first one of said plurality of separate information streams;
said data being utilized to search for said second one of said plurality of separate information stream; and
said second one of said plurality of separate information streams being simultaneously presented with said first one of said plurality of separate information stream.

57. The system according to claim 56, further comprising said data being utilized to search, utilizing an intelligent agent, for said second one of said plurality of separate information stream.

58. The system according to claim 56, further comprising:
said first one of said plurality of separate information streams being received in said client computer system utilizing a Web browser, said first one of said plurality of separate information streams being an audio stream;
data being obtained from said first one of said plurality of separate information streams utilizing said Web browser; and
said data being utilized to search for said second one of said plurality of separate information stream.

59. The system according to claim 58, further comprising said data being utilized to search for said second one of said plurality of separate information stream in a closed database.

60. The system according to claim 58, further comprising said data being utilized to search for said second one afraid plurality of separate information stream in an open database.

61. The system according to claim 58, further comprising said data being utilized to search for said second one of said plurality of separate information stream in a plurality of computer systems that are coupled utilizing the Internet.

62. The system according to claim 58, further comprising said data being utilized to search for said second one of said plurality of separate information stream in a CD inserted into said client computer system.

63. The system according to claim 58, further comprising said data being utilized to search for said second one of said plurality of separate information stream in a Web site maintained by said server computer system.

64. The system according to claim 58, further comprising data being obtained from said first one of said plurality of separate information streams utilizing a speech recognition routine.

65. The system according to claim 55, further comprising a first one of a plurality of separate information streams being selected, said first one of said plurality of separate information streams being an audio broadcast of a lecturer.

66. The system according to claim 55, further comprising a first one of a plurality of separate information streams being selected, said first one of said plurality of separate information streams being a video broadcast of a lecturer.

67. The system according to claim 53, further comprising said first one of said plurality of separate information streams being selected, wherein said plurality of separate information streams includes a video stream.

68. The system according to claim 53, further comprising said first one of said plurality of separate information streams being selected, wherein said plurality of separate information streams includes an audio stream.

69. The system according to claim 53, further comprising said first one of said plurality of separate information streams being selected, wherein said plurality of separate information streams includes a music stream.

70. The system according to claim 53, further comprising:
said first one of said plurality of separate information streams being selected, wherein said plurality of separate information streams includes a presentation presented in a first language;
said presentation being approximately simultaneously translated from said first language to a second language; and
said presentation being presented in said second language.

71. The system according to claim 53, further comprising said first one of said plurality of separate information streams being selected, wherein said plurality of separate information streams includes a stream of advertising information.

72. The system according to claim 71, further comprising said first one of said plurality of separate information stream being utilized to select a stream of advertising information, said stream of advertising information being related to a content of said first one of said plurality of information streams.

73. The system according to claim 53, further comprising a history being maintained for said distance learning environment by tracking a number of times each one of said plurality of information streams was selected by a user.

74. The system according to claim 73, further comprising a second distance learning environment being designed utilizing said history.

75. The system according to claim 53, further comprising a history being maintained for a first user of said distance learning environment by tracking a number of times each one of said plurality of information streams was selected by said first user.

76. The system according to claim 75, further comprising said history being provided to a plurality of users of said distance learning environment.

77. The system according to claim 76, further comprising said history being utilized by a second one of said plurality of users to select one of said plurality of information streams.

78. The system according to claim 53, further comprising means for permitting a user to control an educational presentation presented to said user by said distance learning environment utilizing said plurality of information streams.

* * * * *